United States Patent
Peng et al.

(10) Patent No.: US 12,353,304 B2
(45) Date of Patent: Jul. 8, 2025

(54) SOLID-STATE DISK ACCESS CONTROL METHOD AND APPARATUS, COMPUTER DEVICE, AND STORAGE MEDIUM

(71) Applicant: Suzhou MetaBrain Intelligent Technology Co., Ltd., Jiangsu (CN)

(72) Inventors: Yunwu Peng, Jiangsu (CN); Yu Zou, Jiangsu (CN); Bo Jiang, Jiangsu (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/982,101

(22) Filed: Dec. 16, 2024

(65) Prior Publication Data

US 2025/0117301 A1  Apr. 10, 2025

Related U.S. Application Data

(63) Continuation of application No. PCT/CN2023/116126, filed on Aug. 31, 2023.

(30) Foreign Application Priority Data

Nov. 10, 2022  (CN) .......................... 202211404833.5

(51) Int. Cl.
*G06F 11/00* (2006.01)
*G06F 11/20* (2006.01)

(52) U.S. Cl.
CPC ...... *G06F 11/2033* (2013.01); *G06F 11/2041* (2013.01)

(58) Field of Classification Search
CPC ............. G06F 11/2028; G06F 11/2033; G06F 11/2041; G06F 11/2043; G06F 11/2092; G06F 3/0614; G06F 3/0617
See application file for complete search history.

(56) References Cited

U.S. PATENT DOCUMENTS

2005/0097243 A1  5/2005  Yamashita et al.
2014/0380028 A1  12/2014  Cheng et al.
(Continued)

FOREIGN PATENT DOCUMENTS

CN  101727297 A  6/2010
CN  102405460 A  4/2012
(Continued)

OTHER PUBLICATIONS

International Search Report cited in PCT/CN2023/116126, mailed Dec. 10, 2023, 5 pages.
(Continued)

*Primary Examiner* — Marc Duncan
(74) *Attorney, Agent, or Firm* — Cooper Legal Group, LLC

(57) ABSTRACT

A solid-state disk access control method and apparatus, a computer device, and a storage medium are provided. The method includes: detecting controller nodes connected to a Peripheral Component Interconnect Express (PCIe) switch and Non-Volatile Memory Express (NVMe) solid-state disks connected to the PCIe switch; setting a first mapping connection relationship to be formed between each NVMe solid-state disk and one of the controller nodes, and setting second mapping connection relationships to be formed between each NVMe solid-state disk and the remaining controller nodes; and under a condition that any NVMe solid-state disk is accessed, in response to a determination that the first mapping connection relationship is abnormal, selecting one of the remaining controller nodes as a standby controller of the accessed NVMe solid-state disk, and modifying the second mapping connection relationship between the standby controller and the accessed NVMe solid-state disk to the first mapping connection relationship.

20 Claims, 5 Drawing Sheets

(56) References Cited

U.S. PATENT DOCUMENTS

| | | | | |
|---|---|---|---|---|
| 2018/0246833 | A1* | 8/2018 | Bai | G06F 3/0665 |
| 2019/0138209 | A1* | 5/2019 | Benisty | G06F 12/0238 |
| 2019/0188079 | A1 | 6/2019 | Kohli | |
| 2020/0409885 | A1* | 12/2020 | Denworth | G06F 13/4022 |
| 2023/0051825 | A1* | 2/2023 | Chang | G06F 3/0635 |
| 2024/0129305 | A1* | 4/2024 | Ye | G06F 12/109 |

FOREIGN PATENT DOCUMENTS

| | | | |
|---|---|---|---|
| CN | 104571934 | A | 4/2015 |
| CN | 106020723 | A | 10/2016 |
| CN | 114489497 | A | 5/2022 |
| CN | 114860387 | A | 8/2022 |
| CN | 115454359 | A | 12/2022 |

OTHER PUBLICATIONS

Written Opinion cited in PCT/CN2023/116126, mailed Dec. 10, 2023, 7 pages.
Notification to Grant Patent Right for Invention cited in CN202211404833.5, mailed Jan. 9, 2023, 2 pages.

* cited by examiner

SOLID-STATE DISK ACCESS CONTROL METHOD AND APPARATUS, COMPUTER DEVICE, AND STORAGE MEDIUM

CROSS-REFERENCE TO RELATED APPLICATION

This application is a continuation of International Patent Application No. PCT/CN2023/116126, entitled "SOLID-STATE DISK ACCESS CONTROL METHOD AND APPARATUS, COMPUTER DEVICE, AND STORAGE MEDIUM" and filed on Aug. 31, 2023, which claims priority to Chinese Patent Application No. 202211404833.5, entitled "SOLID-STATE DISK ACCESS CONTROL METHOD AND APPARATUS, COMPUTER DEVICE, AND STORAGE MEDIUM" and filed with the China National Intellectual Property Administration on Nov. 10, 2022. International Patent Application No. PCT/CN2023/116126 and Chinese Patent Application No. 202211404833.5 are incorporated herein by reference in their entireties.

FIELD

The present application relates to the technical field of solid-state disk access control, and in particular, to a solid-state disk access control method and apparatus, a computer device, and a storage medium.

BACKGROUND

A storage array achieves high reliability and high availability through a hardware redundancy architecture design, a Redundant Array of Independent Disks (RAID), and other software technologies.

NVMe stands for Non-Volatile Memory Express, which means a non-volatile memory host controller interface specification. SSD stands for Solid-State Disk, which means a solid-state disk. An NVMe SSD, as a storage medium, has a single port and dual ports, and may be respectively connected to one controller node and two controller nodes. A centralized storage array uses two controller nodes and a dual port NVMe SSD to achieve 1+1 redundancy. Under a condition that the NVMe SSD directly provides four ports or supports an SR-IOV (Single Root Input/Output Virtualization) characteristic, a system may achieve 4-control sharing on the NVMe SSD, thereby achieving higher reliability and higher availability of 1+3 redundancy.

As shown in FIG. 1, the NVMe SSD needs to support one Page File (PF) and four Virtual Functions (VFs). Each controller node is connected to the NVMe SSD through a Peripheral Component Interconnect Express (PCIe) switch. A built-in Central Processing Unit (CPU) of the PCIe switch ensures, by configuring the PF of the NVMe SSD, that each VF is mapped to a corresponding node. Node [3:0] corresponds to VF [3:0] of the SSD in a one-to-one correspondence manner, and the four nodes may access a same NVMe SSD, thereby achieving 4-control shared access to the NVMe SSD. At present, mainstream NVMe SSDs do not support the SR-IOV characteristic, so NVMe backend 4-control sharing of the architecture shown in FIG. 1 may not be commercialized yet. However, the inventor has realized that there is no NVMe SSD with four ports at present in the industry, which makes it difficult to improve the data transmission redundancy and has low reliability.

SUMMARY

According to a first aspect, the present application provides a solid-state disk access control method, including:

detecting controller nodes connected to a PCIe switch and NVMe solid-state disks connected to the PCIe switch, where each NVMe solid-state disk is connected to the controller nodes through the PCIe switch;

setting a first mapping connection relationship to be formed between each NVMe solid-state disk and one of the controller nodes, and setting second mapping connection relationships to be formed between each NVMe solid-state disk and the remaining controller nodes, where the first mapping connection relationship is a mapping connection between the controller node and a real capacity space of the NVMe solid-state disk, and the second mapping connection relationships are mapping connections between the controller nodes and virtual spaces of the NVMe solid-state disk; and under a condition that any NVMe solid-state disk is accessed, in response to the first mapping connection relationship being normal, performing input and output read-write operation on the accessed NVMe solid-state disk through the controller node corresponding to the first mapping connection relationship, or, in response to the first mapping connection relationship being abnormal, selecting one of the remaining controller nodes as a standby controller of the accessed NVMe solid-state disk, and modifying the second mapping connection relationship between the standby controller and the accessed NVMe solid-state disk to the first mapping connection relationship.

In some embodiments, during the detection of the controller nodes connected to the PCIe switch and the NVMe solid-state disks connected to the PCIe switch, a quantity m+1 of the controller nodes is further synchronously obtained; and the setting a first mapping connection relationship to be formed between each NVMe solid-state disk and one of the controller nodes, and setting second mapping connection relationships to be formed between each NVMe solid-state disk and the remaining controller nodes includes:

for each NVMe solid-state disk, constructing one real capacity space and m virtual spaces according to the quantity m+1 of the controller nodes, where each virtual space is a place holder;

mapping the real capacity space corresponding to each NVMe solid-state disk into one controller node to form the first mapping connection relationship; and respectively mapping the virtual spaces corresponding to the NVMe solid-state disk into the remaining controller nodes to form the second mapping connection relationships.

In some embodiments, during the detection of the controller nodes connected to the PCIe switch and the NVMe solid-state disks connected to the PCIe switch, a quantity n+1 of the NVMe solid-state disks is further synchronously obtained, where n is greater than or equal to m.

In some embodiments, in response to n being equal to m, according to an arrangement sequence of the NVMe solid-state disks, the n+1 real capacity spaces in the n+1 continuously arranged NVMe solid-state disks are respectively mapped into the m+1 controller nodes; and in response to n being greater than m, according to an arrangement sequence of the NVMe solid-state disks, m+1 continuously arranged NVMe solid-state disks are set as a group; the m+1 real capacity spaces in the group are respectively mapped into the m+1 controller nodes; and the real capacity spaces in a remaining group are respectively mapped into different controller nodes according to the same mapping rule.

In some embodiments, the modifying the second mapping connection relationship between the standby controller and the accessed NVMe solid-state disk to the first mapping connection relationship includes: replacing the virtual space of the standby controller with the real capacity space of the accessed NVMe solid-state disk through an NVMe solid-state disk hot-access manner.

In some embodiments, under a condition that selecting one of the remaining controller nodes as a standby controller of the accessed NVMe solid-state disk, the method further includes:

performing one-by-one detection on whether the remaining controller nodes are normal; in response to the remaining controller nodes being normal, selecting a normal controller node as the standby controller of the accessed NVMe solid-state disk, or, in response to the remaining controller nodes being abnormal, deleting an abnormal controller node, and detecting and determining again whether the residual controller nodes are normal until at least one residual controller node is normal.

In some embodiments, during the one-by-one detection on whether the remaining controller nodes are normal, in response to the residual controller nodes being abnormal, alarm information is sent.

In some embodiments, a plurality of PCIe switches are included; each controller node is communicated to the NVMe solid-state disk through each PCIe switch;

during the detection of the controller nodes connected to the PCIe switch and the in NVMe solid-state disks connected to the PCIe switch, a quantity m+1 of the controller nodes connected to each PCIe switch and a quantity n+1 of the NVMe solid-state disks connected to each PCIe switch are further synchronously obtained;

for each PCIe switch, the first mapping connection relationship is set to be formed between each NVMe solid-state disk and one of the controller nodes and the second mapping connection relationships are set to be formed between each NVMe solid-state disk and the remaining controller nodes; and one of the PCIe switches is set to be in an on state, and the remaining PCIe switches are set to be in off states.

In some embodiments, in response to a determination that the PCIe switch that is initially set to be in the on state fails to be turned on, the off state of a normal PCIe switch among the remaining PCIe switches is modified to an on state.

In some embodiments, the off state of a normal PCIe switch among the remaining PCIe switches is modified to an on state, which includes: performing one-by-one detection on whether the remaining PCIe switches are normal; in response to the remaining PCIe switches being normal, selecting a normal PCIe switch, and modifying the off state of the normal PCIe switch to the on state, or, in response to the remaining PCIe switches being abnormal, deleting an abnormal PCIe switch, and detecting and determining again whether the residual PCIe switches are normal until at least one residual PCIe switch is normal.

In some embodiments, during the one-by-one detection on whether the remaining PCIe switches are normal, in response to the residual PCIe switches being abnormal, alarm information is sent.

According to another aspect, the present application provides a solid-state disk access control apparatus, including:

a power-on detection module, configured for detecting controller nodes connected to a PCIe switch and NVMe solid-state disks connected to the PCIe switch, where each NVMe solid-state disk is connected to the controller nodes through the PCIe switch;

a mapping path management module, configured for: setting a first mapping connection relationship to be formed between each NVMe solid-state disk and one of the controller nodes, and setting second mapping connection relationships to be formed between each NVMe solid-state disk and the remaining controller nodes, where the first mapping connection relationship is a mapping connection between the controller node and a real capacity space of the NVMe solid-state disk, and the second mapping connection relationships are mapping connections between the controller nodes and virtual spaces of the NVMe solid-state disk; and an access management module, configured for: under a condition that any NVMe solid-state disk is accessed, in response to the first mapping connection relationship being normal, performing input and output read-write operation on the accessed NVMe solid-state disk through the controller node corresponding to the first mapping connection relationship, or, in response to the first mapping connection relationship being abnormal, selecting one of the remaining controller nodes as a standby controller of the accessed NVMe solid-state disk, and modifying the second mapping connection relationship between the standby controller and the accessed NVMe solid-state disk to the first mapping connection relationship.

In some embodiments, the power-on detection module is further configured for detecting a quantity of PCIe switches; in response to a plurality of PCIe switches, each controller node is communicated to the NVMe solid-state disk through each PCIe switch; the mapping path management module is further configured for: for each PCIe switch, setting the first mapping connection relationship to be formed between each NVMe solid-state disk and one of the controller nodes and setting the second mapping connection relationships to be formed between each NVMe solid-state disk and the remaining controller nodes; and the access management module is further configured for: setting one of the PCIe switches to be in an on state, and setting the remaining PCIe switches to be in off states; and in response to a failure of turning on the PCIe switch that is initially set to be in an on state, modifying an off state of a normal PCIe switch among the remaining PCIe switch to an on state.

According to still another aspect, the present application provides a computer device, including one or more memories, one or more processors, and computer-readable instructions stored on the one or more memories and executable on the one or more processors. The one or more processors, when executing the computer-readable instructions, implement the steps of the above solid-state disk access control method.

According to yet another aspect, the present application provides a non-volatile computer-readable storage medium, having computer-readable instructions stored thereon. The computer-readable instructions, when executed by one or more processors, implement the steps of the above solid-state disk access control method.

BRIEF DESCRIPTION OF THE DRAWINGS

For clearer descriptions of the technical solutions according to the embodiments of the present application, the drawings required to be used in the description of the embodiments are briefly introduced below. It is obvious that the drawings in the description below are some embodiments of the present application, and it is obvious for those skilled in the art that other drawings may be acquired according to the drawings without creative efforts.

DETAILED DESCRIPTION

To make objectives, technical solutions, and advantages of the present application clearer, the following is a further detailed explanation of the present application in conjunction with the accompanying drawings and embodiments. It should be understood that the embodiments described here are intended to explain the present application and are not intended to limit the present application.

As mentioned in the background section, the current mainstream NVMe SSDs do not support the SR-IOV characteristic, whereby an NVMe backend multi-control shared access path may not be commercialized. As a result, it is hard to improve the data transmission redundancy, and the reliability is low.

To solve above problems, the present application provides a solid-state disk access control method. Based on a PCIe synthetic mode of a PCIe 4.0 switch, by reserving PCIe resources through a Basic Input/Output System (BIOS) and a PCIe driver in advance, detecting controller node faults, achieving quick failover in case of a fault, and recognizing a difference between an SSD and a place holder by system software, unauthorized access may be avoided. 4-control sharing may be achieved on an ordinary NVMe SSD, thereby meeting 1+3 redundancy, and a requirement for high reliability.

Figure 1:
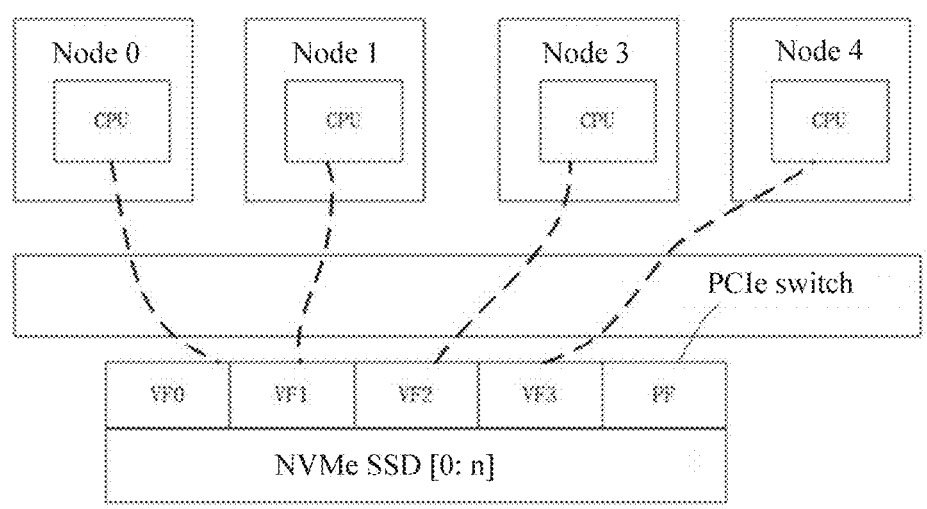
FIG. 1 is a schematic diagram of a connection structure of an existing NVMe SSD.
Figure 2:
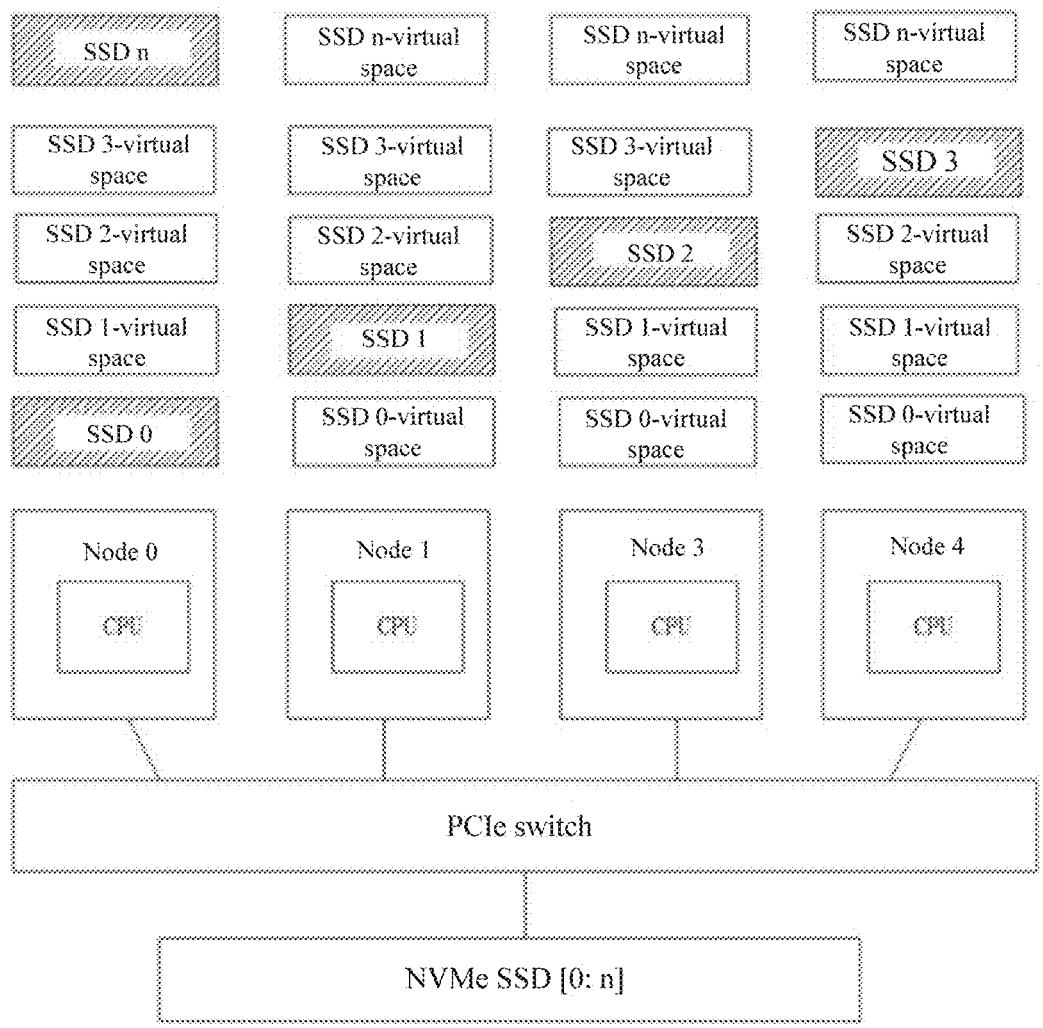
FIG. 2 is a schematic diagram of an application of a solid-state disk access control method in one or more embodiments of the present application.

As shown in FIG. 2, an NVMe 4-node system has following strategies for processing scenarios where the system is normally powered on, controller nodes are abnormal, and the like:

(1) The NVMe 4-node system is powered on normally. During self inspection of a BIOS, PCIe equipment is scanned, and a method of real space+virtual space Place Holder of an NVMe SSD is used to apply for a space for PCIe reserved resources to each of four controller nodes. A real capacity space of the NVMe SSD is mapped to one controller node, and virtual spaces Place Holder are mapped to the other three controller nodes.

In FIG. 2, the shadow box SSD [0:n] represents the real capacity space of the SSD, and the shadowless box SSD [0:n]-PH represents the virtual space Place Holder.

(2) Service software may correctly recognize a difference between the real space of the NVMe SSD and the virtual space Place Holder of the NVMe SSD, thus avoiding an invalid access to SDD data storage space. During normal operation, each controller node accesses the real capacity space of the mapped NVMe SSD and completes an IO read-write operation, such as real capacity space SSD0 corresponding to Node 0 and real capacity space SSD1 corresponding to Node 1. Real capacity space SSD [0:n] of the SSD may achieve the IO read-write operation, and SSD [0:n]-PH corresponding to the virtual space Place Holder may not achieve the IO read-write operation. One controller node corresponds to the real capacity space of the SSD, thereby avoiding the illegal access to the data storage space of the SSD.

(3) In response a determination that an abnormality occurs, a controller node fails and goes offline. A system cluster synchronizes this fault state to the remaining controller nodes and selects one standby controller. By using an NVMe SSD hot-access manner, the virtual space Place Holder of the selected standby controller is replaced with the real capacity space of the NVMe SSD to ensure normal use of the NVMe SSD. For example, in response to a determination that controller node 3 fails, the real capacity space of SSD3 may be arbitrarily mapped to controller nodes 1, 2, and 3.

(4) In case of an extreme abnormality, in response to a determination that three of the four controller nodes fail, the NVMe SSDs may replace the virtual space Place Holder allocated to the normal controller node with the real capacity spaces of the NVMe SSDs using the hot-access manner, to achieve high availability of 1+3 redundancy of the controller nodes and ensure a service continuity of the NVMe SSDs.

The beneficial effects achieved by the technical solution of the present application include: (1) mass-produced components such as PCIe 4.0 Switches and general-purpose NVMe SSDs are used. The entire system uses an relevant mature technology (which monitors a controller node fault and synchronizes the fault to cluster software, and the cluster software completes fault node switching), and the service software implements 4-control shared access on an NVMe SSD and meets the requirements for high reliability and high availability of 1+3 redundancy. Compared with an NVMe Over Fabric solution, the hardware system solution is simpler and has lower costs. (2) After NVMe SSDs that support SR-IOV appear on the market and become a mainstream, there is no need to redesign hardware of the system. Through adaptation and modification of software, 4-control sharing of the NVMe SSDs may be achieved too.

The present application provides some other embodiments based on the same inventive concept as the above embodiment. In these embodiments, a plurality of PCIe switches are included, and each controller node is communicated to an NVMe solid-state disk (NVMe SSD) through each PCIe switch.

Figure 3:
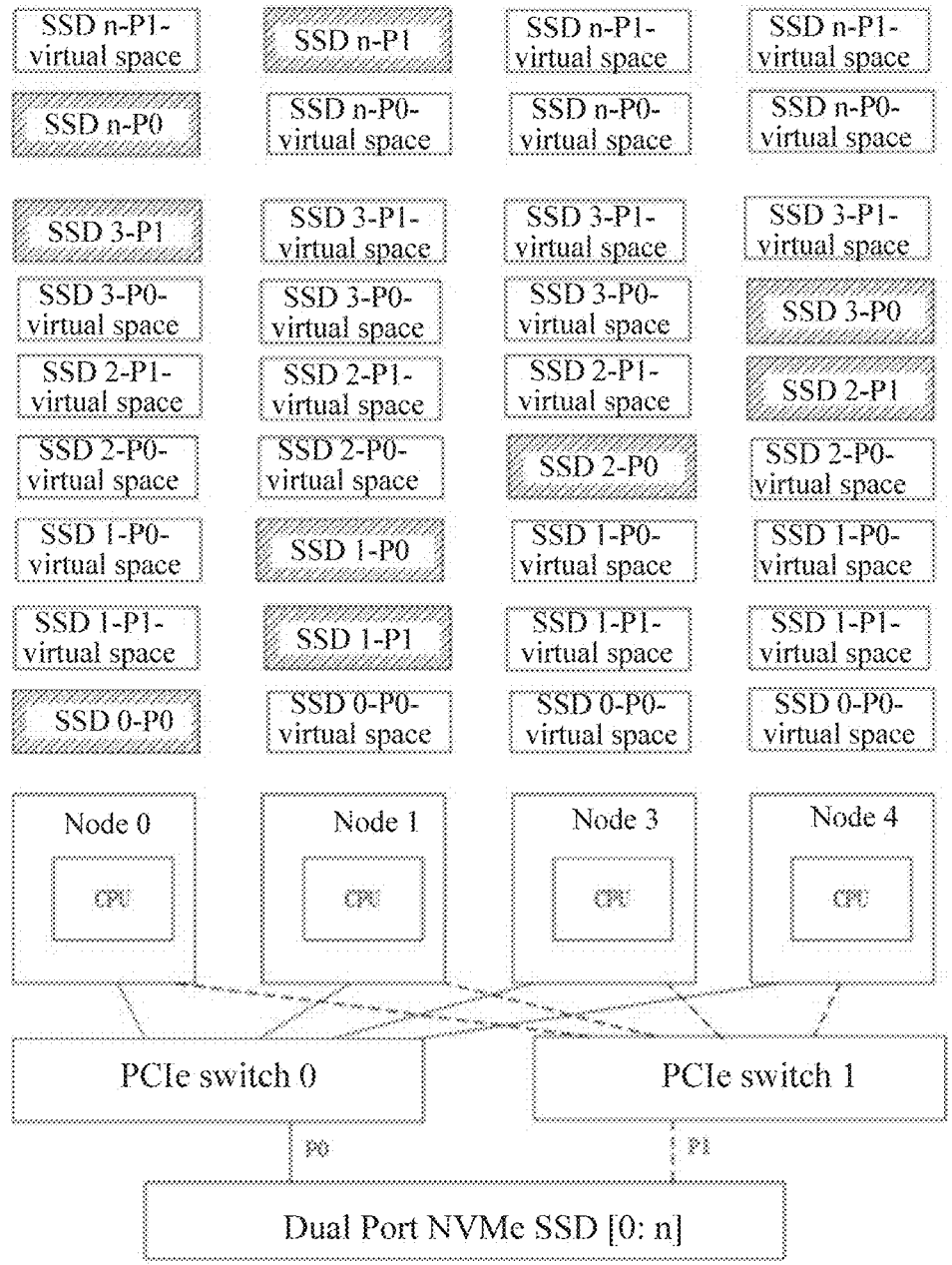
FIG. 3 is a schematic diagram of an application of a solid-state disk access control method in another or more embodiments of the present application.

As shown in FIG. 3, centralized storage uses an NVMe 4-node system composed of a dual port NVMe SSD, two dual-plane PCIe Switches, and four controller nodes. The controller nodes support 1+3 redundancy, the dual-plane PCIe Switches support 1+1 redundancy, and NVMe supports dual port access. Modules are designed with redundancy and have no single-point fault. The system has higher reliability and higher availability.

In FIG. 3, the dual port NVMe SSD achieves connection between two ports and the two dual-plane PCIe Switches. Box SSD [0:n]-P0 marked with dot shadow in the figure represents a real capacity space accessible by SSD-Port0. Box SSD [0:n]-P1 marked with slash shadow represents a real capacity space accessible by SSD-Port1. Shadowless box SSD [0:n]-PH is a virtual space Place Holder.

It may be understood that the dual port NVMe SSD achieves the connection between the two ports and the two dual-plane PCIe Switches, which may further increase a redundancy setting quantity of an access path and improve the data transmission redundancy, and has higher reliability.

Figure 4:
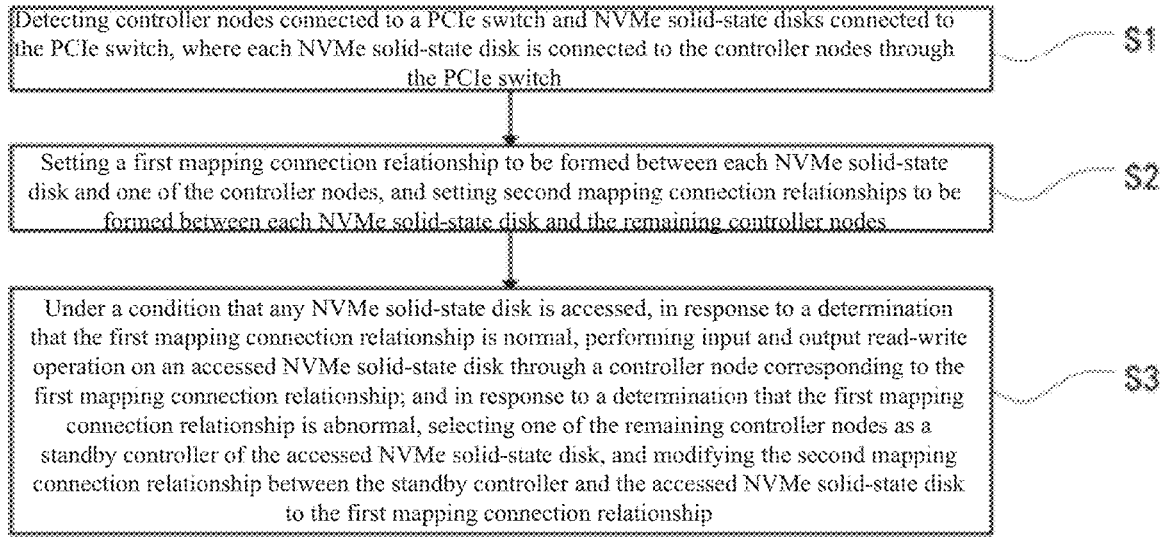
FIG. 4 is a flowchart of a solid-state disk access control method in one or more embodiments of the present application.

Based on the above embodiments, the present application further provides some other embodiments. In some embodiments, as shown in FIG. 4, following steps are included:

Step S1, detecting controller nodes connected to a PCIe switch and NVMe solid-state disks connected to the PCIe switch, where each NVMe solid-state disk is connected to the controller nodes through the PCIe switch.

NVMe stands for Non-Volatile Memory Express, which means a non-volatile memory host controller interface specification. SSD stands for Solid-State Disk, which means a solid-state disk. PCIe switch represents a Peripheral Component Interconnect Express switch.

An initial connection structure on the PCIe switch is detected in step S1. The NVMe 4-node system in FIG. 2 is taken as an example. The NVMe 4-node system is powered on normally. During self inspection of a BIOS, PCIe equipment is scanned, and a method of real space+virtual space Place Holder of an NVMe SSD is used to apply for a space for PCIe reserved resources to each of four controller nodes. A real capacity space of each NVMe SSD is mapped to one controller node, and a virtual space Place Holder is mapped to the other three controller nodes.

Four controller nodes connected to the PCIe switch, such as Node 0, Node 1, Node 3, and Node 4, are obtained, and NVMe solid-state disks connected to Node 0, Node 1, Node 3, and Node 4 are respectively obtained. Each of the four controller nodes is connected to a plurality of solid-state disks. For example, in FIG. 2, there are four nodes, and each node is connected to at least four solid-state disks.

One of the four solid-state disks connected to each node is set to be a real capacity space to support execution of a function of the node, and remaining three solid-state disks are set to be virtual spaces, to reserve replacement positions for the remaining three nodes in case of a fault. For example, for Node 0, solid-state disk 0 connected to Node 0 is a real capacity space to support execution of a function of Node 0; solid-state disk 1 connected to Node 0 is a virtual space, and solid-state disk 1 reserves a real capacity space for Node 1; solid-state disk 2 connected to Node 0 is a virtual space, and solid-state disk 2 reserves a real capacity space for Node 3; and solid-state disk 3 connected to Node 0 is a virtual space, and solid-state disk 3 reserves a real capacity space for Node 4. A plurality of real capacity spaces may be set in the solid-state disks connected to Node 0, and solid-state disk n connected to Node 0 in FIG. 2 is also a real capacity space.

Step S2, setting a first mapping connection relationship to be formed between each NVMe solid-state disk and one of the controller nodes, and setting second mapping connection relationships to be formed between each NVMe solid-state disk and the remaining controller nodes, where the first mapping connection relationship is a mapping connection between the controller node and a real capacity space of the NVMe solid-state disk, and the second mapping connection relationships are mapping connections between the controller nodes and virtual spaces of the NVMe solid-state disk.

Referring to FIG. 2, in step S2, a mapping connection relationship between the real capacity space connected to each controller node and the virtual spaces connected to each controller node. For example, connecting Node 0 to solid-state disk 0 represents the first mapping connection relationship, and connecting Node 0 to solid-state disk 1, solid-state disk 2, and solid-state disk 3 represents the second mapping connection relationships. It should be noted that the mapping connection relationships are used for associating the nodes with addresses of the solid-state disks, namely, setting a node function execution access link and reserving access links for other nodes.

Step S3, under a condition that any NVMe solid-state disk is accessed, in response to a determination that the first mapping connection relationship is normal, performing input and output read-write operation on the accessed NVMe solid-state disk through the controller node corresponding to the first mapping connection relationship; and in response to a determination that the first mapping connection relationship is abnormal, selecting one of the remaining controller nodes as a standby controller of the accessed NVMe solid-state disk, and modifying the second mapping connection relationship between the standby controller and the accessed NVMe solid-state disk to the first mapping connection relationship.

The first mapping connection relationship being normal means that a function of the corresponding controller node may be executed, indicating that the controller node is available. The first mapping connection relationship being abnormal means that a function of the corresponding controller node may not be executed, indicating that the controller node is unavailable.

In response to a determination that the first mapping connection relationship of Node 1 for accessing is abnormal, Node 1 may not be connected to solid-state disk 1. In this case, to execute a function corresponding to Node 1, the function of Node 1 needs to be transferred to another node. In response to a determination that Node 0 is selected to execute the function of Node 1, an NVMe solid-state disk for executing the function of Node 1 needs to be configured on Node 0. As mentioned above, in step S1, it is detected and obtained that a virtual space position reserved for Node 1 is the virtual space of solid-state disk 1. In this case, the virtual space of solid-state disk 1 connected to Node 0 may be changed to a real capacity space to execute the function of Node 1. Namely, the second mapping connection relationship of the virtual space of solid-state disk 1 connected to Node 0 may be modified to the first mapping connection relationship.

One PCIe switch in FIG. 2 is explained above. As shown in FIG. 3, under a condition that a plurality of PCIe switches are included, a failure of a single PCIe switch is avoided by redundancy. PCIe switch 0 and PCIe switch 1 are configured in FIG. 3. PCIe switch 0 works normally and PCIe switch 1 remains off as redundancy. PCIe switch 1 is turned on in response to a determination that PCIe switch 0 fails to work normally.

Each of PCIe switch 0 and PCIe switch 1 is connected to a set of NVMe solid-state disks. A structure of connecting each of PCIe switch 0 and PCIe switch 1 to a set of NVMe solid-state disk may be seen in FIG. 2. In FIG. 3, the NVMe solid-state disks respectively connected to PCIe switch 0 and PCIe switch 1 are merged. Namely, solid-state disk 0-P0 connected to Node 0 corresponding to PCIe switch 0 is a real capacity space; solid-state disk 3-P1 connected to Node 1 corresponding to PCIe switch 0 is real capacity space; and the remaining solid-state disks connected to Node 0 corresponding to PCIe switch 0 are virtual spaces. Other nodes are in the same principle and will not be elaborated here.

In step S1 of some embodiments, during the detection of the controller nodes connected to the PCIe switch and the NVMe solid-state disks connected to the PCIe switch, a quantity m+1 of the controller nodes is further synchronously obtained.

In step S2 of some embodiments, the setting a first mapping connection relationship to be formed between each NVMe solid-state disk and one of the controller nodes, and setting second mapping connection relationships to be formed between each NVMe solid-state disk and the remaining controller nodes includes:

for each NVMe solid-state disk, constructing one real capacity space and m virtual spaces according to the quantity m+1 of the controller nodes, where each virtual space is a place holder; mapping the real capacity space corresponding to each NVMe solid-state disk into one controller node to form the first mapping connection relationship; and respectively mapping the virtual spaces corresponding to the NVMe solid-state disk into the remaining controller nodes to form the second mapping connection relationships.

It may be understood that the real capacity spaces in the continuously arranged NVMe solid-state disks are respectively mapped in sequence into the m+1 controller nodes according to an arrangement sequence of the controller nodes.

In some embodiments, in step S1 of some embodiments, during the detection of the controller nodes connected to the PCIe switch and the NVMe solid-state disks connected to the PCIe switch, a quantity n+1 of the NVMe solid-state disks is further synchronously obtained, where n is greater than or equal to m. Where m and n are both positive integers. In some embodiments, the quantity m+1 of the controller nodes is 4, so m=3, namely, four controller nodes are provided. 4-control sharing may be achieved on an ordinary NVMe SSD, thereby meeting a requirement of 1+3 redundancy and high reliability.

In response to a determination that n is equal to m, according to an arrangement sequence of the NVMe solid-state disks, the n+1 real capacity spaces in the n+1 continuously arranged NVMe solid-state disks are respectively mapped into the m+1 controller nodes; and in response to a determination that n is greater than m, according to an arrangement sequence of the NVMe solid-state disks, m+1 continuously arranged NVMe solid-state disks are set as a group; the m+1 real capacity spaces in the group are respectively mapped into the m+1 controller nodes; and the real capacity spaces in a remaining group are respectively mapped into different controller nodes according to the same mapping rule.

In step S3 of some embodiments, the modifying the second mapping connection relationship between the standby controller and the accessed NVMe solid-state disk to the first mapping connection relationship includes: replacing the virtual space of the standby controller with the real capacity space of the accessed NVMe solid-state disk through an NVMe solid-state disk hot-access manner.

In step S3 of some embodiments, under a condition that selecting one of the remaining controller nodes as a standby controller of the accessed NVMe solid-state disk, the method further includes:

performing one-by-one detection on whether the remaining controller nodes are normal; in response to a determination that the remaining controller nodes are normal, selecting a normal controller node as the standby controller of the accessed NVMe solid-state disk; in response to a determination that the remaining controller nodes are abnormal, deleting an abnormal controller node, and detecting and determining again whether the residual controller nodes are normal until at least one residual controller node is normal; and in response to a determination that the residual controller nodes are abnormal, sending alarm information.

During use, based on a PCIe synthetic mode of a PCIe 4.0 switch, by reserving PCIe resources through a BIOS and a PCIe driver in advance, detecting controller node faults, achieving quick failover in case of a fault, and recognizing a difference between an SSD and a place holder by system software, unauthorized access may be avoided.

In some embodiments, there are four controller nodes. An NVMe 4-node system has the following strategies for processing scenarios where the system is normally powered on, controller nodes are abnormal, and the like:

(1) The NVMe 4-node system is powered on normally. During self inspection of a BIOS, PCIe equipment is scanned, and a method of real space+virtual space Place Holder of an NVMe SSD is used to apply for a space for PCIe reserved resources to each of four controller nodes. A real capacity space of the NVMe SSD is mapped to one controller node, and virtual spaces Place Holder are mapped to the other three controller nodes.

In FIG. 2, the shadow box SSD [0:n] represents the real capacity space of the SSD, and the shadowless box SSD [0:n]-PH represents the virtual space Place Holder.

(2) Service software may correctly recognize a difference between the real space of the NVMe SSD and the virtual space Place Holder of the NVMe SSD, thus avoiding an invalid access to SSD data storage space. During normal operation, each controller node accesses the real capacity space of the mapped NVMe SSD and completes an IO read-write operation, such as real capacity space SSD0 corresponding to Node 0 and real capacity space SSD1 corresponding to Node 1. Real capacity space SSD [0:n] of the SSD may achieve the IO read-write operation, and SSD [0:n]-PH corresponding to the virtual space Place Holder may not achieve the IO read-write operation. One controller node corresponds to the real capacity space of the SSD, thereby avoiding the illegal access to the data storage space of the SSD.

(3) In response to a determination that an abnormality occurs, a controller node fails and goes offline. A system cluster synchronizes this fault state to the remaining controller nodes and selects one standby controller. By using an NVMe SSD hot-access manner, the virtual space Place Holder of the selected standby controller is replaced with the real capacity space of the NVMe SSD to ensure normal use of the NVMe SSD. For example, in response to a determination that controller node 3 fails, the real capacity space of SSD3 may be arbitrarily mapped to controller nodes 1, 2, and 3.

(4) In case of an extreme abnormality, in response to a determination that three of the four controller nodes fail, the NVMe SSDs may replace the virtual space Place Holder allocated to the normal controller node with the real capacity spaces of the NVMe SSDs using the hot-access manner, to achieve high availability of 1+3 redundancy of the controller nodes and ensure a service continuity of the NVMe SSDs.

In some embodiments, a plurality of PCIe switches are included, and each controller node is communicated to an NVMe solid-state disk (NVMe SSD) through each PCIe switch.

In step S1 of some embodiments, during the detection of the controller nodes connected to the PCIe switch and the NVMe solid-state disks connected to the PCIe switch, a quantity m+1 of the controller nodes connected to each PCIe switch and a quantity n+1 of the NVMe solid-state disks connected to each PCIe switch are further synchronously obtained.

In step S2 of some embodiments, for each PCIe switch, the first mapping connection relationship is set to be formed between each NVMe solid-state disk and one of the controller nodes and the second mapping connection relationships are set to be formed between each NVMe solid-state disk and the remaining controller nodes.

In some embodiments, one of the PCIe switches is further set to be in an on state, and the remaining PCIe switches are set to be in off states. Under a condition that any NVMe solid-state disk is accessed, in response to a determination that the PCIe switch that is initially set to be in the on state fails to be turned on, the off state of a normal PCIe switch among the remaining PCIe switches is modified to an on state.

In some embodiments, the off state of a normal PCIe switch among the remaining PCIe switches is modified to an on state, which includes: performing one-by-one detection on whether the remaining PCIe switches are normal; in response to a determination that the remaining PCIe switches are normal, selecting a normal PCIe switch, and modifying the off state of the normal PCIe switch to the on state; and in response to a determination that the remaining PCIe switches are abnormal, deleting an abnormal PCIe switch, and detecting and determining again whether the residual PCIe switches are normal until at least one residual PCIe switch is normal.

During the one-by-one detection on whether the remaining PCIe switches are normal, in response to a determination that the remaining PCIe switches are abnormal, alarm information is sent.

Referring to FIG. 2 and FIG. 3, in step S2 of some embodiments, respectively mapping the real capacity space corresponding to each NVMe solid-state disk and the virtual spaces corresponding to each NVMe solid-state disk to different controller nodes includes:

respectively mapping, according to an arrangement sequence of the controller nodes, the real capacity spaces in the continuously arranged NVMe solid-state disks in sequence into the m+1 controller nodes corresponding to each PCIe switch.

In some embodiments, n is greater than or equal to m. Where m and n are both positive integers. In some embodiments, the quantity m+1 of the controller nodes is 4, so m=3, namely, four controller nodes are provided. 4-control sharing may be achieved on an ordinary NVMe SSD, thereby meeting a requirement of 1+3 redundancy and high reliability.

In response to a determination that n is equal to m, according to an arrangement sequence of the NVMe solid-state disks, the n+1 real capacity spaces in the n+1 continuously arranged NVMe solid-state disks are respectively mapped into the m+1 controller nodes corresponding to each PCIe switch. NVMe solid-state disks where the real capacity spaces in the same controller node corresponding to different PCIe switches are located are different. In response to a determination that n is greater than m, according to an arrangement sequence of the NVMe solid-state disks, m+1 continuously arranged NVMe solid-state disks are set as a group, and the m+1 real capacity spaces in the group are respectively mapped into the m+1 controller nodes corresponding to each PCIe switch. NVMe solid-state disks where the real capacity spaces in the same controller node corresponding to different PCIe switches are located are different. The real capacity spaces in a remaining group are respectively mapped into different controller nodes according to the same mapping rule.

It may be understood that the dual port NVMe SSD achieves the connection between the two ports and the two dual-plane PCIe Switches, which may further increase a redundancy setting quantity of an access path and improve the data transmission redundancy, and has higher reliability.

In the solid-state disk access control method of the above embodiment, by mapping the real capacity space corresponding to each NVMe solid-state disk and the virtual spaces corresponding to each NVMe solid-state disk into different controller nodes, each controller node is set to access the mapped real capacity space of the NVMe solid-state disk, thereby avoiding an invalid access to a data storage space of a solid-state disk. Moreover, the plurality of controller nodes may access the NVMe solid-state disk after modifying the virtual spaces mapped to the controller nodes to the real capacity space, thereby achieving a redundant setting for a plurality of access paths, improving the data transmission redundancy, and achieving high reliability.

It is understood that although the steps in the flowchart of FIG. 4 are displayed in sequence according to the instructions of the arrows, these steps are not necessarily performed in sequence according to the sequence indicated by the arrows. Unless otherwise explicitly specified in the present application, execution of the steps is not strictly limited, and the steps may be performed in other sequences. Moreover, at least some of the steps in FIG. 4 may include a plurality of sub steps or a plurality of stages. These sub steps or stages are not necessarily performed at the same moment but may be performed at different moments. Execution of these sub steps or stages is not necessarily performed in sequence, but may be performed in turn or alternately with other steps or sub steps in other steps or at least some of the stages.

Figure 5:
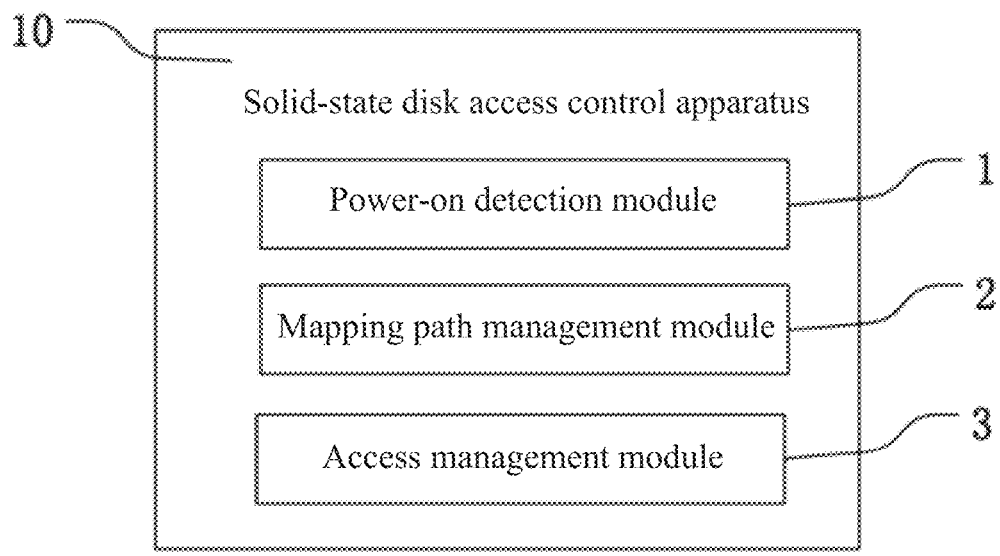
FIG. 5 is a structural block diagram of a solid-state disk access control apparatus in one or more embodiments of the present application.

In some embodiments, as shown in FIG. 5, a solid-state disk access control apparatus 10 is provided, including: a power-on detection module 1, a mapping path management module 2, and an access management module 3.

The power-on detection module 1 is configured for detecting controller nodes connected to a PCIe switch and NVMe solid-state disks connected to the PCIe switch, where each NVMe solid-state disk is connected to the controller nodes through the PCIe switch. The power-on detection module 1 is configured for synchronously detecting the controller nodes connected to the PCIe switch and the NVMe solid-state disks connected to the PCIe switch, where each NVMe solid-state disk is connected to the controller nodes through the PCIe switch.

The mapping path management module 2 is configured for: setting a first mapping connection relationship to be formed between each NVMe solid-state disk and one of the controller nodes, and setting second mapping connection relationships to be formed between each NVMe solid-state disk and the remaining controller nodes. The first mapping connection relationship is a mapping connection between the controller node and a real capacity space of the NVMe solid-state disk, and the second mapping connection relationships are mapping connections between the controller nodes and virtual spaces of the NVMe solid-state disk. In some embodiments, the mapping path management module 2 is configured for: setting a first mapping connection relationship to be formed between each NVMe solid-state disk and one of the controller nodes, and setting second mapping connection relationships to be formed between each NVMe solid-state disk and the remaining controller nodes. The first mapping connection relationship is a mapping connection between the controller node and a real capacity space of the NVMe solid-state disk, and the second mapping connection relationships are mapping connections between the controller nodes and virtual spaces of the NVMe solid-state disk.

The access management module 3 is configured for: mapping the real capacity space corresponding to each NVMe solid-state disk into one controller node to form the first mapping connection relationship, and respectively mapping the virtual spaces corresponding to the NVMe solid-state disk into the remaining controller nodes to form the second mapping connection relationships. The first mapping connection relationship is a mapping connection between the controller node and the real capacity space of the NVMe solid-state disk, and the second mapping connection relationships are mapping connections between the controller nodes and the virtual spaces of the NVMe solid-state disk. In some embodiments, under a condition that any NVMe solid-state disk is accessed, in response to a determination that the first mapping connection relationship is normal, input and output read-write operation is performed on the accessed NVMe solid-state disk through the controller node corresponding to the first mapping connection relationship; and in response to a determination that the first mapping connection relationship is abnormal, one of the remaining controller nodes is selected as a standby controller of the accessed NVMe solid-state disk, and the second mapping connection relationship between the standby controller and the accessed NVMe solid-state disk is modified to the first mapping connection relationship.

In the mapping path management module 2 of some embodiments, the setting a first mapping connection relationship to be formed between each NVMe solid-state disk and one of the controller nodes, and setting second mapping connection relationships to be formed between each NVMe solid-state disk and the remaining controller nodes includes:

for each NVMe solid-state disk, constructing one real capacity space and m virtual spaces according to the quantity m+1 of the controller nodes, where each virtual space is a place holder;

mapping the real capacity space corresponding to each NVMe solid-state disk into one controller node to form the first mapping connection relationship; and respectively mapping the virtual spaces corresponding to the NVMe solid-state disk into the remaining controller nodes to form the second mapping connection relationships.

It may be understood that the real capacity spaces in the continuously arranged NVMe solid-state disks are respectively mapped in sequence into the m+1 controller nodes according to an arrangement sequence of the controller nodes.

In some embodiments, n is greater than or equal to m, where m and n are both positive integers. In some embodiments, the quantity m+1 of the controller nodes is 4, so m=3, namely, four controller nodes are provided. 4-control sharing may be achieved on an ordinary NVMe SSD, thereby meeting a requirement for high reliability of 1+3 redundancy.

In response to a determination that n is equal to m, according to an arrangement sequence of the NVMe solid-state disks, the n+1 real capacity spaces in the n+1 continuously arranged NVMe solid-state disks are respectively mapped into the m+1 controller nodes; and in response to a determination that n is greater than m, according to an arrangement sequence of the NVMe solid-state disks, m+1 continuously arranged NVMe solid-state disks are set as a group; the m+1 real capacity spaces in the group are respectively mapped into the m+1 controller nodes; and the real capacity spaces in a remaining group are respectively mapped into different controller nodes according to the same mapping rule.

Under a condition that any NVMe solid-state disk is accessed, the access management module 3 of some embodiments performs:

in response to a determination that the controller node mapped with the real capacity space of the NVMe solid-state disk fails and goes offline, transmitting a state of the failed and offline controller node to the remaining controller nodes; and selecting one of the remaining controller nodes as a standby controller of the accessed NVMe solid-state disk, and replacing the virtual space of the standby controller with the real capacity space of the accessed NVMe solid-state disk through an NVMe solid-state disk hot-access manner.

Namely, the modifying the second mapping connection relationship between the standby controller and the accessed NVMe solid-state disk to the first mapping connection relationship includes: replacing the virtual space of the standby controller with the real capacity space of the accessed NVMe solid-state disk through an NVMe solid-state disk hot-access manner.

Under a condition that selecting one of the remaining controller nodes as a standby controller of the accessed NVMe solid-state disk, the access management module 3 of some embodiments further performs:

performing one-by-one detection on whether the remaining controller nodes are normal; in response to a determination that the remaining controller nodes are normal, selecting a normal controller node as the standby controller of the accessed NVMe solid-state disk; in response to a determination that the remaining controller nodes are abnormal, deleting an abnormal controller node, and detecting and determining again whether the residual controller nodes are normal until at least one residual controller node is normal; and in response to a determination that the residual controller nodes are abnormal, sending alarm information.

In some embodiments, a plurality of PCIe switches are included. Each controller node is communicated to the NVMe solid-state disk through each PCIe switch.

During the detection of the controller nodes connected to the PCIe switch and the NVMe solid-state disks connected to the PCIe switch, the power-on detection module 1 is further configured for detecting a quantity of PCIe switches, and synchronously obtaining a quantity m+1 of the controller nodes connected to each PCIe switch and a quantity n+1 of the NVMe solid-state disks connected to each PCIe switch.

The mapping path management module 2 is further configured for: for each PCIe switch, setting the first mapping connection relationship to be formed between each NVMe solid-state disk and one of the controller nodes, and setting the second mapping connection relationships to be formed between each NVMe solid-state disk and the remaining controller nodes.

The access management module 3 is further configured for: setting one of the PCIe switches to be in an on state, and setting the remaining PCIe switches to be in off states. In response to a determination that the PCIe switch that is initially set to be in the on state fails to be turned on, the off state of a normal PCIe switch among the remaining PCIe switches is modified to an on state.

In this case, respectively mapping the real capacity space corresponding to each NVMe solid-state disk and the virtual spaces corresponding to each NVMe solid-state disk to different controller nodes includes:

respectively mapping, according to an arrangement sequence of the controller nodes, the real capacity spaces in the continuously arranged NVMe solid-state disks in sequence into the m+1 controller nodes corresponding to each PCIe switch.

In some embodiments, n is greater than or equal to n, where m and n are both positive integers. In some embodiments, the quantity m+1 of the controller nodes is 4, so m=3, namely, four controller nodes are provided. 4-control sharing may be achieved on an ordinary NVMe SSD, thereby meeting a requirement for high reliability of 1+3 redundancy.

In response to a determination that n is equal to m, according to an arrangement sequence of the NVMe solid-state disks, the n+1 real capacity spaces in the n+1 continuously arranged NVMe solid-state disks are respectively mapped into the m+1 controller nodes corresponding to each PCIe switch, where NVMe solid-state disks where the real capacity spaces in the same controller node corresponding to different PCIe switches are located are different; and in response to a determination that n is greater than m, according to an arrangement sequence of the NVMe solid-state disks, m+1 continuously arranged NVMe solid-state disks are set as a group, and the m+1 real capacity spaces in the group are respectively mapped into the m+1 controller nodes corresponding to each PCIe switch, where NVMe solid-state disks where the real capacity spaces in the same controller node corresponding to different PCIe switches are located are different; and the real capacity spaces in a remaining group are respectively mapped into different controller nodes according to the same mapping rule.

In the above solid-state disk access control apparatus 10, by mapping the real capacity space corresponding to each NVMe solid-state disk and the virtual spaces corresponding to each NVMe solid-state disk into different controller nodes, each controller node is set to access the mapped real capacity space of the NVMe solid-state disk, thereby avoiding an invalid access to a data storage space of a solid-state disk. Moreover, the plurality of controller nodes may access the NVMe solid-state disk after modifying the virtual spaces mapped to the controller nodes to the real capacity space, thereby achieving a redundant setting for a plurality of access paths, improving the data transmission redundancy, and achieving high reliability.

The limitations on the solid-state disk access control apparatus may be found in the limitations on the solid-state disk access control method described above, and will not be elaborated here. The various modules in the solid-state disk access control apparatus may be implemented entirely or partially through software, hardware, or a combination thereof. The above modules may be embedded in or independent of a processor in a computer device in a hardware form, or stored in a memory in the computer device in a software form, for the processor to invoke and execute the operations corresponding to the above modules.

Figure 6:
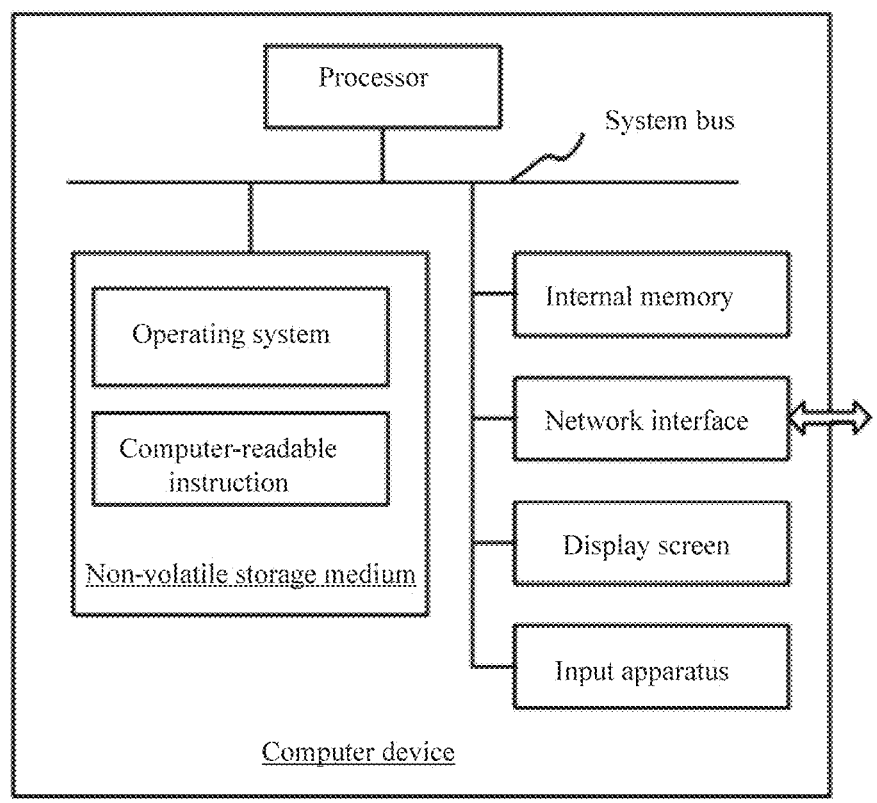
FIG. 6 is a diagram of an internal structure of a computer device in one or more embodiments of the present application.

In some embodiments, a computer device is provided. The computer device may be a server, a diagram of an internal structure of which may be as shown in FIG. 6. The computer device includes one or more processors, one or more memories, a network interface, and a database which are connected through a system bus. The processor of the computer device is configured for providing computation and control abilities. The memory of the computer device includes a non-volatile storage medium and an internal memory. The non-volatile storage medium stores an operating system, computer-readable instructions, and a database. The internal memory provides an environment for running the operating system and the computer-readable instructions in the non-volatile storage medium. The database of the computer device is configured for storing solid-state disk access control data. The network interface of the computer device is used for communicating with an external terminal through network connection. The computer-readable instructions, when executed by the one or more processors, implement a solid-state disk access control method.

A person skilled in the art may understand that, the structure shown in FIG. 6 is merely a block diagram of partial structures related to a solution in the present application, and does not constitute a limitation on the computer device to which the solution of the present application is applied. In some embodiments, the computer device may include more components or fewer components than those shown in the figure, or some components may be combined, or a different component deployment may be used.

In some embodiments, a computer device is provided, including one or more memories, one or more processors, and computer-readable instructions stored on the one or more memories and executable on the one or more processors. The one or more processors, when executing the computer-readable instructions, implement steps of a solid-state disk access control method.

The limitations on implementation of the steps when the one or more processes execute the computer-readable instructions may be found in the limitations on the solid-state disk access control method described above, and will not be elaborated here.

In some embodiments, the present application provides a non-volatile computer-readable storage medium, having computer-readable instructions stored thereon. The computer-readable instructions, when executed by one or more processors, implement the steps of the above solid-state disk access control method.

The limitations on implementation of the steps when the computer-readable instructions are executed by the one or more processors may be found in the limitations on the solid-state disk access control method described above, and will not be elaborated here.

A person of ordinary skill in the art may understand that all or some of the procedures of the method in the foregoing embodiments may be implemented by the computer-readable instructions that instruct relevant hardware. The computer-readable instructions may be stored in a non-volatile computer-readable storage medium. When the computer-readable instructions are executed, the procedures of the foregoing method embodiments may be implemented. Any reference to the memory, the database, or other media used in the embodiments provided in the present application may include a non-volatile memory and/or a volatile memory. The non-volatile memory may include a read-only (ROM), a programmable ROM (PROM), an electrically programmable ROM (EPROM), an electrically erasable programmable ROM (EEPROM), or a flash memory. The volatile memory may include a random access (RAM) or an external cache memory. As an illustration and not a limitation, the RAM may be obtained in various forms, such as a static RAM (SRAM), a dynamic RAM (DRAM), a synchronous DRAM (SDRAM), a dual data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features of the above embodiments may be combined randomly. For the sake of brevity, possible combinations of the technical features in the above embodiments are not described. However, these technical features shall be considered to fall within the scope of this specification as long as there is no contradiction in their combinations.

The foregoing embodiments merely express several implementations of the present application. The descriptions thereof are relatively detailed, but are not understood as limitations on the scope of the patent of the application. A person of ordinary skill in the art may also make several transformations and improvements without departing from the idea of the present application. These transformations and improvements fall within the protection scope of the present application. Therefore, the protection scope of the patent of the present application shall be subject to the appended claims.

The invention claimed is:

1. A solid-state disk access control method, comprising:
detecting all controller nodes connected to a Peripheral Component Interconnect Express (PCIe) switch and all Non-Volatile Memory Express (NVMe) solid-state disks connected to the PCIe switch, wherein each NVMe solid-state disk is connected to all the controller nodes through the PCIe switch;
setting a first mapping connection relationship to be formed between each NVMe solid-state disk and one controller node of all the controller nodes, and setting second mapping connection relationships to be formed between each NVMe solid-state disk and remaining controller nodes of all the controller nodes, wherein the first mapping connection relationship is a mapping connection between the one controller node of all the controller nodes and a real capacity space of the NVMe solid-state disk, and the second mapping connection relationships are mapping connections between the remaining controller nodes and virtual spaces of the NVMe solid-state disk; and
when any NVMe solid-state disk is accessed, in response to the first mapping connection relationship being normal, performing input and output read-write operation on an accessed NVMe solid-state disk through the one controller node of all the controller nodes corresponding to the first mapping connection relationship, and, in response to the first mapping connection relationship being abnormal, selecting one of the remaining controller nodes as a standby controller of the accessed NVMe solid-state disk, and modifying the second mapping connection relationship between the standby controller and the accessed NVMe solid-state disk to the first mapping connection relationship.

2. The solid-state disk access control method according to claim 1, wherein
during the detecting all controller nodes connected to a PCIe switch and all NVMe solid-state disks connected to the PCIe switch, synchronously obtaining a quantity m+1 of all the controller nodes, where m is a positive integer.

3. The solid-state disk access control method according to claim 2, wherein the setting a first mapping connection relationship to be formed between each NVMe solid-state disk and one controller node of all the controller nodes, and setting second mapping connection relationships to be formed between each NVMe solid-state disk and remaining controller nodes of all the controller nodes comprises:
for each NVMe solid-state disk, constructing one real capacity space and m virtual spaces according to the quantity m+1 of the controller nodes; and
mapping the one real capacity space corresponding to each NVMe solid-state disk into the one controller node of all the controller nodes to form the first mapping connection relationship, and respectively mapping the m virtual spaces corresponding to the NVMe solid-state disk into the remaining controller nodes to form the second mapping connection relationships.

4. The solid-state disk access control method according to claim 3, wherein the one real capacity space achieves an Input and Output (IO) read-write operation, and the m virtual spaces do not achieve the IO read-write operation.

5. The solid-state disk access control method according to claim 3, wherein each of the m virtual spaces is a place holder.

6. The solid-state disk access control method according to claim 3, wherein the mapping the one real capacity space corresponding to each NVMe solid-state disk into the one controller node of all the controller nodes comprises:
respectively mapping, according to an arrangement sequence of all the controller nodes, the real capacity spaces in continuously arranged NVMe solid-state disks in sequence into m+1 controller nodes of all the controller nodes corresponding to each PCIe switch.

7. The solid-state disk access control method according to claim 6, wherein m=3, and a quantity m+1 of all the controller nodes is 4.

8. The solid-state disk access control method according to claim 2, wherein during the detecting all controller nodes connected to a PCIe switch and all NVMe solid-state disks connected to the PCIe switch, synchronously obtaining a quantity n+1 of all the NVMe solid-state disks, wherein n is greater than or equal to m, where n is a positive integer.

9. The solid-state disk access control method according to claim 8, wherein
in response to n being equal to m, according to an arrangement sequence of all the NVMe solid-state disks, n+1 real capacity spaces in n+1 continuously arranged NVMe solid-state disks of all the NVMe solid-state disks are respectively mapped into m+1 controller nodes of all the controller nodes.

10. The solid-state disk access control method according to claim 8, wherein
in response to n being greater than m, according to an arrangement sequence of all the NVMe solid-state disks, setting m+1 continuously arranged NVMe solid-state disks of all the NVMe solid-state disks as a group; wherein m+1 real capacity spaces in the group are respectively mapped into m+1 controller nodes of all the controller nodes, and real capacity spaces in a remaining group are respectively mapped into different controller nodes of all the controller nodes according to a same mapping rule.

11. The solid-state disk access control method according to claim 8, wherein a plurality of PCIe switches are comprised, and in response to n being equal to m or n being greater than m, all the NVMe solid-state disks where the real capacity spaces in a same controller node of all the controller nodes corresponding to different PCIe switches of the plurality of PCIe switches are located are different.

12. The solid-state disk access control method according to claim 1, wherein the modifying the second mapping connection relationship between the standby controller and the accessed NVMe solid-state disk to the first mapping connection relationship comprises:
replacing a virtual space of the standby controller with a real capacity space of the accessed NVMe solid-state disk through an NVMe solid-state disk hot-access manner.

13. The solid-state disk access control method according to claim 12, wherein in response to selecting one of the remaining controller nodes as the standby controller of the accessed NVMe solid-state disk, the method further comprises:
  performing one-by-one detection on whether the remaining controller nodes are normal;
  in response to the remaining controller nodes being normal, selecting a normal controller node as the standby controller of the accessed NVMe solid-state disk; and
  in response to the remaining controller nodes being abnormal, deleting an abnormal controller node, and detecting and determining again whether residual controller nodes of the remaining controller nodes are normal until at least one residual controller node is normal.

14. The solid-state disk access control method according to claim 13, wherein during the one-by-one detection on whether the remaining controller nodes are normal, in response to the remaining controller nodes being abnormal, sending alarm information.

15. The solid-state disk access control method according to claim 1, wherein a plurality of PCIe switches are comprised; each controller node is communicated to all the NVMe solid-state disk through each of the plurality of PCIe switches;
  during the detecting all controller nodes connected to a PCIe switch and all NVMe solid-state disks connected to the PCIe switch, a quantity m+1 of all the controller nodes connected to each of the plurality of PCIe switches and a quantity n+1 of all the NVMe solid-state disks connected to each of the plurality of PCIe switches are further synchronously obtained, where m and n are both positive integers;
  for each of the plurality of PCIe switches, the first mapping connection relationship is set to be formed between each NVMe solid-state disk and the one controller node of all the controller nodes and the second mapping connection relationships are set to be formed between each NVMe solid-state disk and the remaining controller nodes of all the controller nodes; and
  one PCIe switch of the plurality of PCIe switches is set to be in an on state, and remaining PCIe switches of the plurality of PCIe switches are set to be in an off state.

16. The solid-state disk access control method according to claim 15, wherein in response to a failure of turning on the one PCIe switch of the plurality of PCIe switches that is initially set to be in the on state, the off state of a normal PCIe switch among the remaining PCIe switches of the plurality of PCIe switches is modified to the on state.

17. The solid-state disk access control method according to claim 16, wherein the off state of a normal PCIe switch among the remaining PCIe switches of the plurality of PCIe switches is modified to the on state, comprises:
  performing one-by-one detection on whether the remaining PCIe switches are normal;
  in response to the remaining PCIe switches being normal, selecting the normal PCIe switch, and modifying the off state of the normal PCIe switch to the on state; and
  in response to the remaining PCIe switches being abnormal, deleting an abnormal PCIe switch, and detecting and determining again whether residual PCIe switches of the remaining PCIe switches are normal until at least one residual PCIe switch is normal.

18. The solid-state disk access control method according to claim 17, wherein during the performing one-by-one detection on whether the remaining PCIe switches are normal, in response to the remaining PCIe switches being all abnormal, sending alarm information.

19. A computer device, comprising a memory, a processor, and a computer program stored on the memory and executable on the processor, wherein the processor, when executing the computer program, implements steps of:
  detecting all controller nodes connected to a Peripheral Component Interconnect Express (PCIe) switch and all Non-Volatile Memory Express (NVMe) solid-state disks connected to the PCIe switch, wherein each NVMe solid-state disk is connected to all the controller nodes through the PCIe switch;
  setting a first mapping connection relationship to be formed between each NVMe solid-state disk and one controller node of all the controller nodes, and setting second mapping connection relationships to be formed between each NVMe solid-state disk and remaining controller nodes of all the controller nodes, wherein the first mapping connection relationship is a mapping connection between the one controller node of all the controller nodes and a real capacity space of the NVMe solid-state disk, and the second mapping connection relationships are mapping connections between the remaining controller nodes and virtual spaces of the NVMe solid-state disk; and
  when any NVMe solid-state disk is accessed, in response to the first mapping connection relationship being normal, performing input and output read-write operation on an accessed NVMe solid-state disk through the one controller node of all the controller nodes corresponding to the first mapping connection relationship, and, in response to the first mapping connection relationship being abnormal, selecting one of the remaining controller nodes as a standby controller of the accessed NVMe solid-state disk, and modifying the second mapping connection relationship between the standby controller and the accessed NVMe solid-state disk to the first mapping connection relationship.

20. A non-transitory computer-readable storage medium, having a computer program stored thereon, wherein the computer program, when executed by a processor, implements steps of:
  detecting all controller nodes connected to a Peripheral Component Interconnect Express (PCIe) switch and all Non-Volatile Memory Express (NVMe) solid-state disks connected to the PCIe switch, wherein each NVMe solid-state disk is connected to all the controller nodes through the PCIe switch;
  setting a first mapping connection relationship to be formed between each NVMe solid-state disk and one controller node of all the controller nodes, and setting second mapping connection relationships to be formed between each NVMe solid-state disk and remaining controller nodes of all the controller nodes, wherein the first mapping connection relationship is a mapping connection between the one controller node of all the controller nodes and a real capacity space of the NVMe solid-state disk, and the second mapping connection relationships are mapping connections between the remaining controller nodes and virtual spaces of the NVMe solid-state disk; and
  when any NVMe solid-state disk is accessed, in response to the first mapping connection relationship being normal, performing input and output read-write operation on an accessed NVMe solid-state disk through the one controller node of all the controller nodes corresponding to the first mapping connection relationship, and, in response to the first mapping connection relationship being abnormal, selecting one of the remaining controller nodes as a standby controller of the accessed NVMe solid-state disk, and modifying the second mapping connection relationship between the standby controller and the accessed NVMe solid-state disk to the first mapping connection relationship.

* * * * *